United States Patent
Liu et al.

(10) Patent No.: US 10,688,731 B2
(45) Date of Patent: Jun. 23, 2020

(54) SYSTEM AND METHOD FOR BONDING STRUCTURAL COMPONENTS

(71) Applicant: TE CONNECTIVITY CORPORATION, Berwyn, PA (US)

(72) Inventors: Hailing Liu, Fremont, CA (US); Rebecca Wan Chai, Fremont, CA (US); Lei Wang, San Jose, CA (US); Peter Dutton, Fremont, CA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/884,364

(22) Filed: Jan. 30, 2018

(65) Prior Publication Data

US 2019/0232570 A1 Aug. 1, 2019

(51) Int. Cl.
*B29C 65/48* (2006.01)
*B29C 65/34* (2006.01)
(Continued)

(52) U.S. Cl.
CPC ...... *B29C 65/4855* (2013.01); *B29C 65/3432* (2013.01); *B29C 65/3468* (2013.01); *B29C 65/3476* (2013.01); *B29C 65/3492* (2013.01); *B29C 65/3684* (2013.01); *B29C 65/5021* (2013.01); *B29C 65/5057* (2013.01);
(Continued)

(58) Field of Classification Search
CPC .............. B29C 65/3432; B29C 65/344; B29C 65/3476; B29C 65/3492; B29C 65/4855; B29C 66/73751; B29C 66/7392; B29C 66/91221; B29C 65/34; B29C 65/3496
See application file for complete search history.

(56) References Cited

U.S. PATENT DOCUMENTS 5,389,184 A 2/1995 Jacaruso et al.
6,426,484 B1 7/2002 Hembree et al.
(Continued)

FOREIGN PATENT DOCUMENTS

EP 2539135 B1 7/2015
JP S57 72816 A 5/1982

OTHER PUBLICATIONS

Oliveux et al. "Current Status of Recycling of Fibre Reinforced Polymers: Review of Technologies, Reuse and Resulting Properties" University of Birmingham; Nov. 2017 (40 pages).
(Continued)

*Primary Examiner* — George R Koch (57) ABSTRACT

System includes a first object having an energy-assisted bonding (EAB) mechanism along a surface of the first object. The EAB mechanism includes a heat-activatable adhesive layer and a carbon-filled (CF) sheet material. The CF sheet material is electrically conductive for resistive heating. A control sub-system is configured to control a coupling actuator to drive an actuator body toward the first object, wherein the actuator body and the first object engage each other. The coupling actuator is configured to apply pressure to the EAB mechanism along the surface of the first object. The control sub-system is also configured to control the power source to apply a current through the CF sheet material of the EAB mechanism to provide thermal energy through resistive heating that activates the adhesive layer along the interface.

20 Claims, 7 Drawing Sheets

(51) Int. Cl.
  *B29C 65/00* (2006.01)
  *B29C 65/50* (2006.01)
  *B29C 65/36* (2006.01)
(52) U.S. Cl.
  CPC ........ *B29C 66/1122* (2013.01); *B29C 66/474* (2013.01); *B29C 66/81423* (2013.01); *B29C 66/81435* (2013.01); *B29C 66/824* (2013.01); *B29C 66/8322* (2013.01); *B29C 66/91221* (2013.01); *B29C 66/9241* (2013.01); *B29C 66/95* (2013.01); *B29C 65/344* (2013.01); *B29C 65/3696* (2013.01); *B29C 65/4815* (2013.01); *B29C 65/4835* (2013.01); *B29C 65/5014* (2013.01); *B29C 65/5028* (2013.01); *B29C 66/721* (2013.01); *B29C 66/7392* (2013.01); *B29C 66/73751* (2013.01)

(56) References Cited

U.S. PATENT DOCUMENTS

| | | | |
|---|---|---|---|
| 8,864,077 | B2 | 10/2014 | Metzech et al. |
| 2004/0099659 | A1 | 5/2004 | Johnson, Jr. |
| 2011/0159764 | A1* | 6/2011 | Price ................. B32B 15/08 442/228 |
| 2011/0212331 | A1 | 9/2011 | Dyke et al. |
| 2011/0284691 | A1* | 11/2011 | Wlach (Metzech) ................. B29C 65/3476 244/131 |
| 2012/0211144 | A1 | 8/2012 | Litzenberger et al. |
| 2015/0030864 | A1* | 1/2015 | Takeuchi ............... B32B 27/08 428/458 |
| 2017/0043528 | A1* | 2/2017 | Conway ................ B29C 65/344 |
| 2017/0173860 | A1 | 6/2017 | Grgac et al. |

OTHER PUBLICATIONS

Wang et al. "Improvement of Composite Drape Forming Quality by Enhancing Interply Slip" 17th European Conference on Composite Materials; Jun. 2016 (8 pages).
International Search Report, International Application No. PCT/IB2019/050720, International Filing Date, Jan. 29, 2019.
Da Costa, A Review of Welding Technologies for Thermoplastic Composites in Aerospace Applications, J. Aerosp. Technol. Manag., Jul.-Sep. 2012, vol. 4, No. 3, pp. 255-265, Sao Jose dos Campos, Brazil.
Optiveil® for Support, Technical Fibre Products Ltd., 2012, Scenectady, NY, USA.

* cited by examiner

SYSTEM AND METHOD FOR BONDING STRUCTURAL COMPONENTS

BACKGROUND

The subject matter herein relates generally to methods of securing two objects to each other and materials that are used for the same.

Manufacturing often involves joining two objects together. One common method is applying an adhesive between the two objects and activating the adhesive so that the adhesive bonds to each object and solidifies, thereby joining the two objects. The adhesive may be activated by allowing the adhesive to dry, by applying heat or pressure, or by causing a chemical reaction. A combination of the above techniques may also be used.

The technique used to join the objects may be determined by the compositions of the two objects and by the intended application of the combined structure. Aerospace manufacturers, as one example, may use strong, lightweight materials, such as carbon fiber reinforced plastic (CFRP). CFRP components may be intended for environments in which the components experience a large amount of stress and inclement weather. For such applications, it is desirable to have the objects strongly affixed to one another.

Methods today include welding the two components together and manually joining the objects using a two-part epoxy adhesive. Each of these methods has drawbacks. For example, welding can permanently change the objects and is often irreversible such that the two objects cannot be separated without damaging the objects. Two-part epoxy adhesives can be labor intensive and may take several hours for the joint to cure. Results from two-part adhesives can also be inconsistent. Other methods for joining two objects that require less time and with more consistent results are desired. It is also desirable to be capable of separating the objects, after joining, without the objects being damaged.

BRIEF DESCRIPTION

In an embodiment, a system is provided that includes a first object having an energy-assisted bonding (EAB) mechanism along a surface of the first object. The EAB mechanism includes a heat-activatable adhesive layer and a carbon-filled (CF) sheet material. The CF sheet material extends alongside the adhesive layer or through the adhesive layer. The CF sheet material is electrically conductive for resistive heating. The first object also includes a mounting face. The system also includes a coupling actuator having an actuator body with a mating face that is sized and shaped to engage the mounting face of the first object. The system also includes a power source and a control sub-system operably coupled to the coupling actuator and the power source. The control sub-system is configured to control the coupling actuator to drive the actuator body toward the first object, wherein the mating face of the actuator body and the mounting face of the first object engage each other. The coupling actuator is configured to apply pressure to the EAB mechanism along the surface of the first object. The control sub-system is also configured to control the power source to apply a current through the CF sheet material of the EAB mechanism to provide thermal energy through resistive heating that activates the adhesive layer along the interface.

In some aspects, the EAB mechanism is a pre-formed film that includes the adhesive layer and the CF sheet material. Optionally, the first object has a depression in which the EAB mechanism is positioned. The pre-formed film is patterned to substantially fill the depression.

In some aspects, the first object is a pre-conditioned object in which the EAB mechanism is secured to the surface of the first object through crosslinking.

In some aspects, the system also includes electrodes operably coupled to the power source and attached to the actuator body, wherein the electrodes approach the EAB mechanism as the actuator body approaches the first object. Optionally, the first object includes electrode channels. The electrode channels open to an exterior of the first object at one end and opening to the EAB mechanism at another end, wherein the electrodes are permitted to advance through the electrode channels and engage the EAB mechanism as the actuator body approaches the first object.

In some aspects, the adhesive layer is a first adhesive layer and the EAB mechanism includes a second adhesive layer. The second adhesive layer is heat-activatable. The first and second adhesive layers having a same composition or different compositions.

In some aspects, the CF sheet material includes or is electrically connected to conductive pathways for energizing the CF sheet material. The system also includes electrodes coupled to the power source. The electrodes are configured to engage the conductive pathways.

In some aspects, the CF sheet material includes carbon elements dispersed within a binder material and the CF sheet material is a nonwoven carbon veil having an areal weight of between 2 $g/m^2$ and 50 $g/m^2$. Optionally, the carbon elements are metal-coated.

In an embodiment, a pre-conditioned object configured to be bonded to another object is provided. The pre-conditioned object includes a surface of the pre-conditioned object and an energy-assisted bonding (EAB) mechanism attached to the surface. The EAB mechanism includes a heat-activatable adhesive layer and a carbon-filled (CF) sheet material. The CF sheet material extends alongside the adhesive layer or through the adhesive layer. The CF sheet material is electrically conductive for resistive heating, wherein the adhesive layer is secured to the surface of the pre-conditioned object through crosslinking.

In some aspects, the pre-conditioned object also includes electrode channels that open to an exterior of the object and to the surface having the EAB mechanism secured thereto.

In some aspects, the EAB mechanism also includes conductive pathways electrically connected to the CF sheet material for energizing the CF sheet material. The conductive pathways are exposed to an exterior of the pre-conditioned object.

In some aspects, EAB mechanism is a pre-formed film having an outer edge. The outer edge is a stamped or cut outer edge.

In some aspects, the CF sheet material includes carbon elements dispersed within a binder material. Optionally, the carbon elements are metal-coated.

In some aspects, the CF sheet material is a nonwoven carbon veil having an areal weight of between 2 $g/m^2$ and 50 $g/m^2$.

In some aspects, the adhesive layer comprises thermoplastic or epoxy.

In some aspects, the adhesive layer includes first and second adhesive layers having the CF sheet material therebetween to form a sub-stack. The EAB mechanism includes at least one additional sub-stack that includes another CF sheet material and another adhesive layer. Optionally, a stiffening layer is disposed between the first and second adhesive layers.

In an embodiment, a method is provided that includes providing a first object having a heat-activatable adhesive layer and a carbon-filled (CF) sheet material along a surface of the first object. The CF sheet material extends alongside the adhesive layer or through the adhesive layer. The CF sheet material is electrically conductive for resistive heating. The method also includes positioning a second object adjacent to the first object such that the adhesive layer and the CF sheet material are disposed along an interface between the first object and the second object. The method also includes applying a current through the CF sheet material to provide thermal energy through resistive heating that activates the adhesive layer along the interface. The method also includes permitting the adhesive layer to solidify, thereby providing a bond that secures the first and second objects to each other along the interface. The CF sheet material remains within the bond between the first and second objects.

In some aspects, as the current is applied through the CF sheet material to provide the thermal energy, the first object and the second object do not receive additional thermal energy from another source. Optionally, the CF sheet material and the adhesive layer are portions of a pre-formed film. The method also includes positioning the pre-formed film along the surface of the first object prior to positioning the second object adjacent to the first object. Also optionally, the pre-formed film is patterned to substantially cover the interface between the first object and the second object.

In some aspects, the adhesive layer is a first adhesive layer. Positioning the first adhesive layer and the CF sheet material along the surface of the first object includes positioning a second adhesive layer along the surface of the first object. The second adhesive layer is heat-activatable. The first and second adhesive layers have a same composition or different compositions. Optionally, the CF sheet material and the first and second adhesive layers are portions of a pre-formed implant. The method also includes positioning the pre-formed implant along the surface of the first object prior to positioning the second object adjacent to the first object.

In some aspects, the CF sheet material includes or is electrically connected to conductive pathways for energizing the CF sheet material. Applying the current through the CF material includes electrically connecting the conductive pathways to a power source.

In some aspects, the CF sheet material includes carbon elements dispersed within a binder material and the CF sheet material is a nonwoven carbon veil having an areal weight of between 1 g/m$^2$ and 400 g/m$^2$. Optionally, the carbon elements are metal-coated.

In some aspects, the adhesive layer comprises a hot-melt adhesive or a one-part heat-activated adhesive.

In some aspects, the method also includes applying pressure to the CF sheet material and the adhesive layer.

In an embodiment, a pre-formed implant for securing two objects to each other is provided. The pre-formed implant includes a first adhesive layer that is heat-activatable and a second adhesive layer that is heat-activatable. The first and second adhesive layers have a same composition or different compositions. The pre-formed implant includes a carbon-filled (CF) sheet material disposed between the first and second adhesive layers. The CF sheet material is electrically conductive for resistive heating.

In some aspects, the pre-formed implant is a pre-formed film having an outer edge. The outer edge is a stamped or cut outer edge that indicates the pre-formed film was a portion of a larger film.

In some aspects, the pre-formed implant also includes conductive pathways electrically connected to the CF sheet material for energizing the CF sheet material. The conductive pathways are exposed to an exterior of the bonding implant.

In some aspects, the CF sheet material may include carbon elements dispersed within a binder material. In some aspects, the CF sheet material is a nonwoven carbon veil having an areal weight of between 1 g/m$^2$ and 400 g/m$^2$. In some aspects, the carbon elements are metal-coated. In some aspects, the first and second adhesive layers comprise thermoplastic or epoxy.

In some aspects, the first adhesive layer, the CF sheet material, and the second adhesive layer form a sub-stack. The bonding implant also includes at least one additional sub-stack that includes another CF sheet material and another adhesive layer.

In some aspects, the pre-formed implant also includes a stiffening layer disposed between the first and second adhesive layers.

DETAILED DESCRIPTION

Embodiments set forth herein include methods, systems, and EAB mechanisms for bonding two objects to each other. The EAB mechanism includes a heat-activatable adhesive material and a conductive layer that is configured to generate thermal energy, thereby activating the adhesive layer. In some embodiments, the EAB mechanism is pre-formed and then positioned between the two objects. In other embodiments, the EAB mechanism may be made during assembly. For example, the adhesive layer may be positioned along a surface of one object followed by the conductive layer (or vice versa). Alternatively, the conductive layer may be positioned along a surface of the other object.

At least one of the objects may be, for example, a carbon fiber reinforced plastic (CFRP) component. CFRP components may be used in the aerospace industry or other industries in which severe conditions (e.g., heat, stress, or inclement weather) may occur during operation. Embodiments secure the objects together to operate sufficiently within such environments. It should be understood, however, that embodiments may be used to secure objects other than CFRP components and used in industries other than the aerospace industry.

Figure 1:
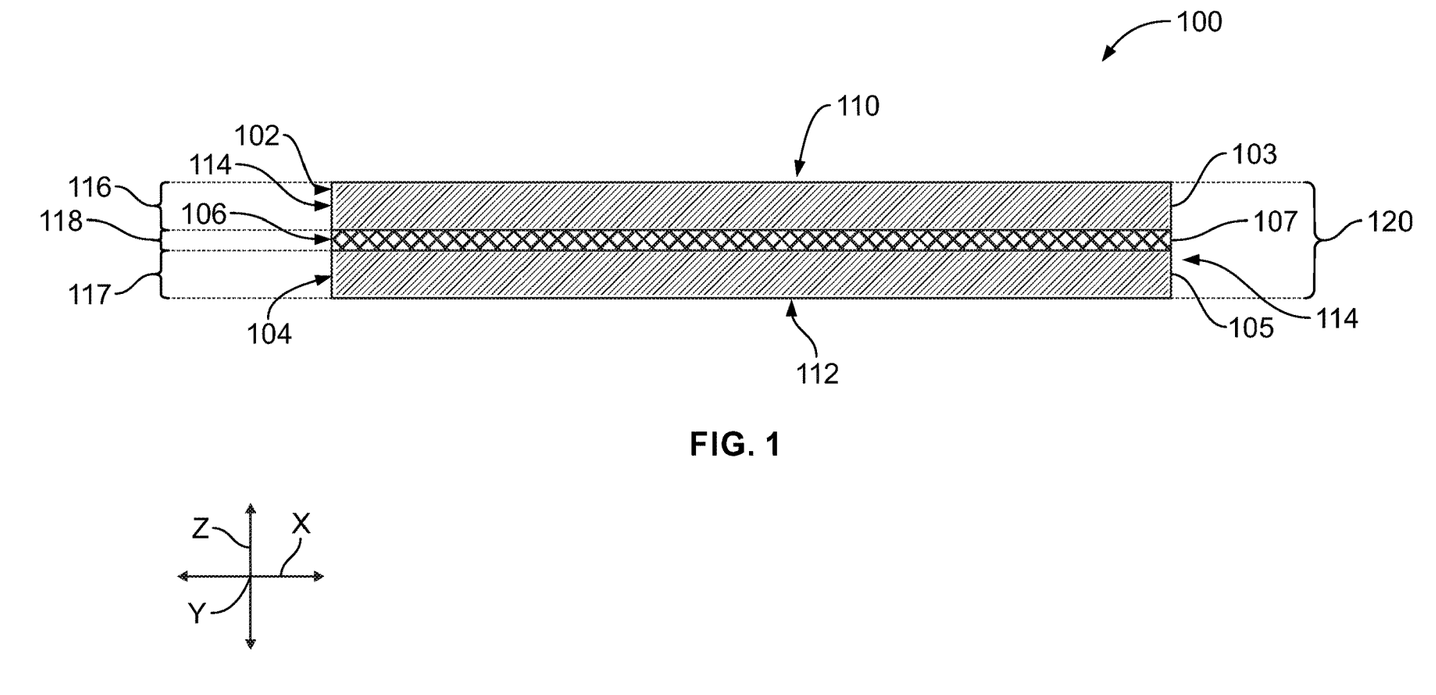
FIG. 1 is a side view of an energy-assisted bonding (EAB) mechanism formed in accordance with an embodiment.

FIG. 1 is a side view of an EAB mechanism 100 that may be used to secure two objects to each other. For example, the EAB mechanism 100 may be positioned between the two objects and thermal energy may be applied to the EAB mechanism. For embodiments in which the EAB mechanism 100 is formed prior to being positioned between the objects, the EAB mechanism 100 may be referred to as a pre-formed implant. In particular embodiments, the pre-formed implant is a pre-formed film. The pre-formed film may be a portion of a larger film. For example, the pre-formed film may be stamped, cut, or etched from a larger film. The remainder of the film may be used to form other pre-formed films.

The EAB mechanism 100 includes adhesive material and a conductive material. In the illustrated embodiment, the EAB mechanism 100 includes a first adhesive layer 102, a second adhesive layer 104, and a conductive layer 106 disposed therebetween. The first adhesive layer 102 has a thickness 103, the second adhesive layer 104 has a thickness 105, and the conductive layer 106 has a thickness 107. As shown, each of the thicknesses 103, 105, 107 is essentially uniform or unchanging such that the respective layers have planar bodies. In other embodiments, however, the thicknesses 103, 105, 107 may not be uniform. For example, the thickness 103 of the first adhesive layer 102 may be different at designated regions.

Although each of the first adhesive layer 102 and the second adhesive layer 104 appear to be a single layer having a uniform composition, in other embodiments, the first adhesive layer 102 and the second adhesive layer 104 may comprise multiple layers or, in other words, sub-layers of a layer. In FIG. 1, the EAB mechanism 100 is shown as being essentially two-dimensional as if applied to a planar surface. The EAB mechanism 100 is not required to be applied to a planar surface and/or have an essentially two-dimensional shape. For example, the first adhesive layer 102, the second adhesive layer 104, and the conductive layer 106 may be wound or wrapped into an EAB roll. In such embodiments, users may unwind the EAB roll to apply a desired length of the EAB mechanism to a surface. The EAB mechanism may be separated from a remainder of the EAB roll using a tool (e.g., knife, ridges on dispenser, etc.).

In some embodiments, the EAB mechanism 100 is a multi-layer stack in which the layers appear to be stacked side-by-side. For reference, the EAB mechanism 100 is oriented with respect to mutually perpendicular axes X, Y, and Z. The EAB mechanism 100 has a first side 110, a second side 112 that is opposite the first side 110, and an outer edge 114. The outer edge 114 defines a perimeter of the EAB mechanism 100.

The first and second adhesive layers 102, 104 and the conductive layer 106 may be shaped to have a designated profile (as viewed along the Z axis) defined by the outer edge 114. The first and second adhesive layers 102, 104 and the conductive layer 106 may be patterned to have a predetermined profile. For example, the first and second adhesive layers 102, 104 and the conductive layer 106 may be stamped, etched, cut, or the like to have a predetermined profile. The predetermined profile may substantially match an area in which the two objects interface one another.

Although the first and second adhesive layers 102, 104 and the conductive layer 106 appear to extend alongside each other and have equal profiles, it should be understood that the first and second adhesive layers 102, 104 and the conductive layer 106 are not required to have equal profiles. For example, the first adhesive layer 102, the second adhesive layer 104, and the conductive layer 106 may have respective layer edges 116, 117, 118. For at least a portion of the EAB mechanism 100, the layer edges 116-118 may be even or flush with one another to form the outer edge 114. In some embodiments, the layer edges 116-118 may be even or flush with one another for the entire profile.

In other embodiments, however, at least one of the layer edges may extend beyond at least one of the other layer edges. For example, the layer edges 117 and 118 may extend beyond the layer edge 116 such that the conductive layer 106 is exposed along a periphery of the EAB mechanism 100. In such embodiments, the layer edge or layer edges that define the outermost edge of the EAB mechanism may be referred to as the outer edge.

Interior portions of the conductive layer 106 may also be exposed along the first side 110 or the second side 112. For instance, the first adhesive layer 102 may have an opening that is defined by an inner edge (not shown). The opening may expose the conductive layer 106 to the side 110.

The first and second adhesive layers 102, 104 may or may not have the same composition. For example, the first adhesive layer 102 may have a composition that is suitable for adhering to a first object, and the second adhesive layer 104 may have a composition that is suitable for adhering to a second object. In some embodiments, the first and second layers 102, 104 have the same adhesive material. The adhesive material may include a hot-melt adhesive or a one-part heat-activated adhesive. Non-limiting examples of the adhesive materials that may be used include thermoplastics, thermoset epoxies, urethanes, polyimides, and the like.

In some embodiments, the conductive layer 106 may be embedded within the EAB mechanism. For example, adhesive material may be permitted to flow along each side of the conductive layer 106 and allow to set or cure. As used herein, a conductive layer is embedded within the adhesive material if the conductive layer is entirely surrounded by the adhesive material or sandwiched between layers of adhesive material. For example, the conductive layer 106 is embedded within the EAB mechanism 100 in FIG. 1.

In FIG. 1, the conductive layer 106 appears to separate the first and second adhesive layers 102, 104 with an equal amount of adhesive material on each side of the conductive layer. In some embodiments, however, the conductive layer 106 may be impregnated or saturated with the material of the first adhesive layer 102 and/or the material of the second adhesive layer 104. For example, the conductive layer 106 may comprise woven or nonwoven fibers or particles. In some embodiments, the woven or nonwoven fibers or particles may be referred to as a mesh or veil. Spaces between the fibers or particles permit adhesive material to flow through the conductive layer. The adhesive material for an impregnated conductive layer may be available along the sides for securing to another material (e.g., object or other layer of EAB mechanism). For embodiments in which the conductive layer 106 is impregnated with adhesive material, the thickness of the conductive layer 106 may equal a thickness 120 of the EAB mechanism 100.

In particular embodiments, the conductive layer 106 is a carbon-filled (CF) sheet material. The CF sheet material may be electrically conductive for resistive heating. For example, the CF sheet material may include particles dispersed within a binder material. The particles may include carbon particles, glass particles, aramid particles, polyester particles, and thermoplastic particles. The CF sheet material may include a blend of particles, such as a blend of glass particles and carbon particles. The blend may include different concentrations of the different particles. The particles may be uniformly distributed such that the CF sheet material has a uniform composition. Alternatively, some particles may have a greater concentration at different regions within the CF sheet material. The particles may include recycled carbon fibers (e.g., short-chopped fibers). In particular embodiments, the particles are metal-coated carbon particles or fibers. The metal may include nickel, copper, silver, gold, ruthenium, or an alloy thereof. For embodiments that include metal-coated particles, the metal may constitute between 10% and 65% of the weight of the CF sheet material.

In some embodiments, the CF sheet material is a nonwoven carbon veil that includes dispersed particles and a polymeric binder for holding the dispersed particles together. The dispersed particles may be carbon fibers. The CF sheet material may be sufficiently porous for permitting the adhesive material to flow through the CF sheet material. In some cases, the amount of binder material is at most 30 wt % of the total weight of the CF sheet material. Non-limiting examples of binder material include poly vinyl alcohol (PVA), polyester (e.g., cross-linked polyester), styrene acrylic, vinyl-acrylic, epoxy, phenoxy, polyurethane, polyamide, acrylate, hybrid, or copolymers thereof.

For embodiments in which the CF sheet material is a nonwoven carbon veil, the particles may be chopped carbon fiber filaments or continuous fiber filaments or combinations thereof. A majority of the fiber filaments may have a cross-sectional diameter that is between 0.01 μm and 15 μm. In particular embodiments, the majority of carbon fiber filaments may have a cross-sectional diameter that is between 4 μm and 7 μm. For embodiments including glass particles, the cross-sectional diameter may be between 4 μm and 11 μm.

The CF sheet material may be formed through, for example, a wet-laid process. In a wet-laid process, wet chopped fibers are dispersed in a water slurry that contains binder(s), and other chemical agents such as surfactant(s), viscosity modifier(s), defoaming agent(s), etc. Once the chopped fibers are introduced into the slurry, the slurry is agitated so that the fibers become dispersed. The slurry containing the fibers is deposited onto a moving screen where a substantial portion of the water is removed to form a web. Optionally, a liquid binder is then applied to the web. The resulting veil is dried to remove any remaining water, and if necessary, to cure the binder(s). The resulting nonwoven veil is an assembly of dispersed, individual fiber filaments arranged in random orientation. Wet-laid processes are typically used when a uniform distribution of fibers and/or weight is desired.

Optionally, the CF sheet material may be metallized with a layer of metal on at least one side of the CF sheet material. Metal coating processes include physical deposition, such as sputtering and sintering, and electrolytic deposition.

The thickness 118 of the conductive layer 106 may be at most 500 micrometers (μm). In some embodiments, the thickness 118 may be at most 250 In certain embodiments, the thickness 118 may be at most 100 μm. In particular embodiments, the thickness 118 may be at most 50 μm. In more particular embodiments, the thickness 118 may be at most 25 μm.

The conductive layer 106 may have an areal weight of between 1 g/m$^2$ and 400 g/m$^2$. In certain embodiment, the conductive layer 106 has an areal weight of between 1 g/m$^2$ and 200 g/m$^2$. In particular embodiments, the conductive layer 106 has an areal weight of between 1 g/m$^2$ and 100 g/m$^2$. In particular embodiments, the conductive layer 106 has an areal weight of between 1 g/m$^2$ and 50 g/m$^2$. Yet in more particular embodiments, the CF sheet material has an areal weight of between 2 g/m$^2$ and 50 g/m$^2$ or, more particularly, an areal weight of between 2 g/m$^2$ and 25 g/m$^2$. Yet in more particular embodiments, the CF sheet material has an areal weight of between 10 g/m$^2$ and 25 g/m$^2$.

The conductive layer 106 may include multiple sub-layers or may be only a single conductive layer. For example, the conductive layer 106 may include at least two sub-layers stacked with respect to one another to form the conductive layer 106. As another example, the EAB mechanism 100 may include two conductive layers 106 having an adhesive layer (or other layer) therebetween.

In particular embodiments, the EAB mechanism 100 is pre-formed such that the conductive layer and the at least one adhesive layer form a unitary structure prior to being positioned between the two objects. For example, the EAB mechanism 100 may form a pre-formed film that is stamped, etched, or cut from a larger film having the same or similar composition of the EAB mechanism 100.

Figure 2:
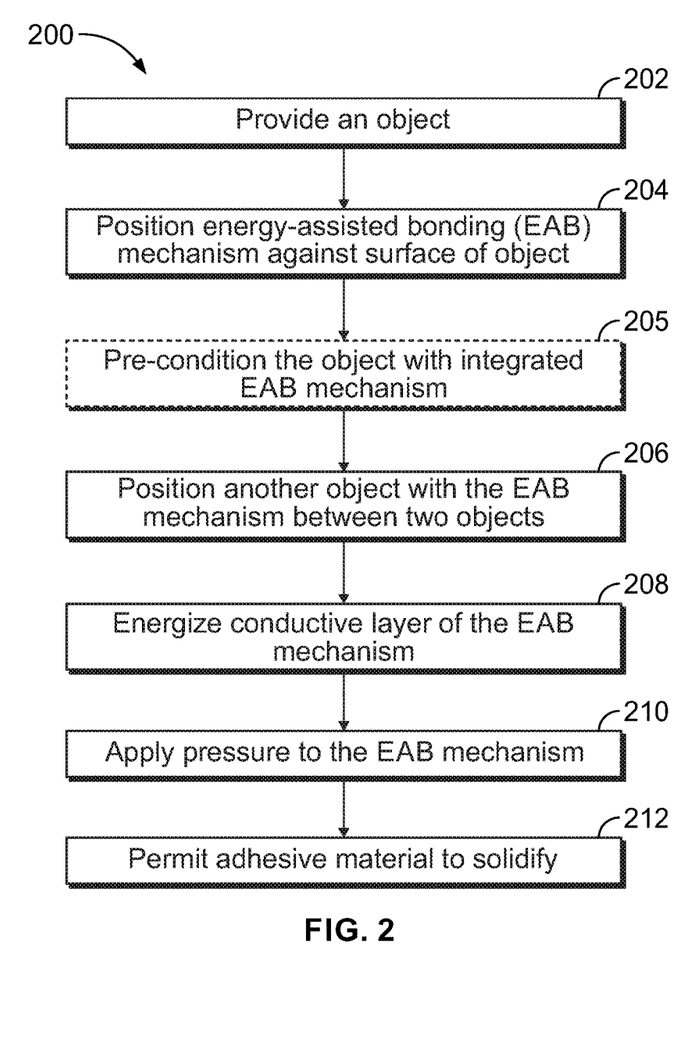
FIG. 2 is a flowchart illustrating a method in accordance with an embodiment.

FIG. 2 is a flowchart of a method 200 in accordance with an embodiment. The method 300 is described with reference to FIG. 4. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

The method 200 may be, for example, a method of bonding two objects to each other or a method of manufacturing an apparatus that includes the two objects. The method 200, for example, may employ structures or aspects of various embodiments discussed herein. In some embodiments, the method 200 is performed using an apparatus, such as an assembly system 220 (FIG. 3B) having a power source 250 and a coupling actuator 270.

Figure 3A:
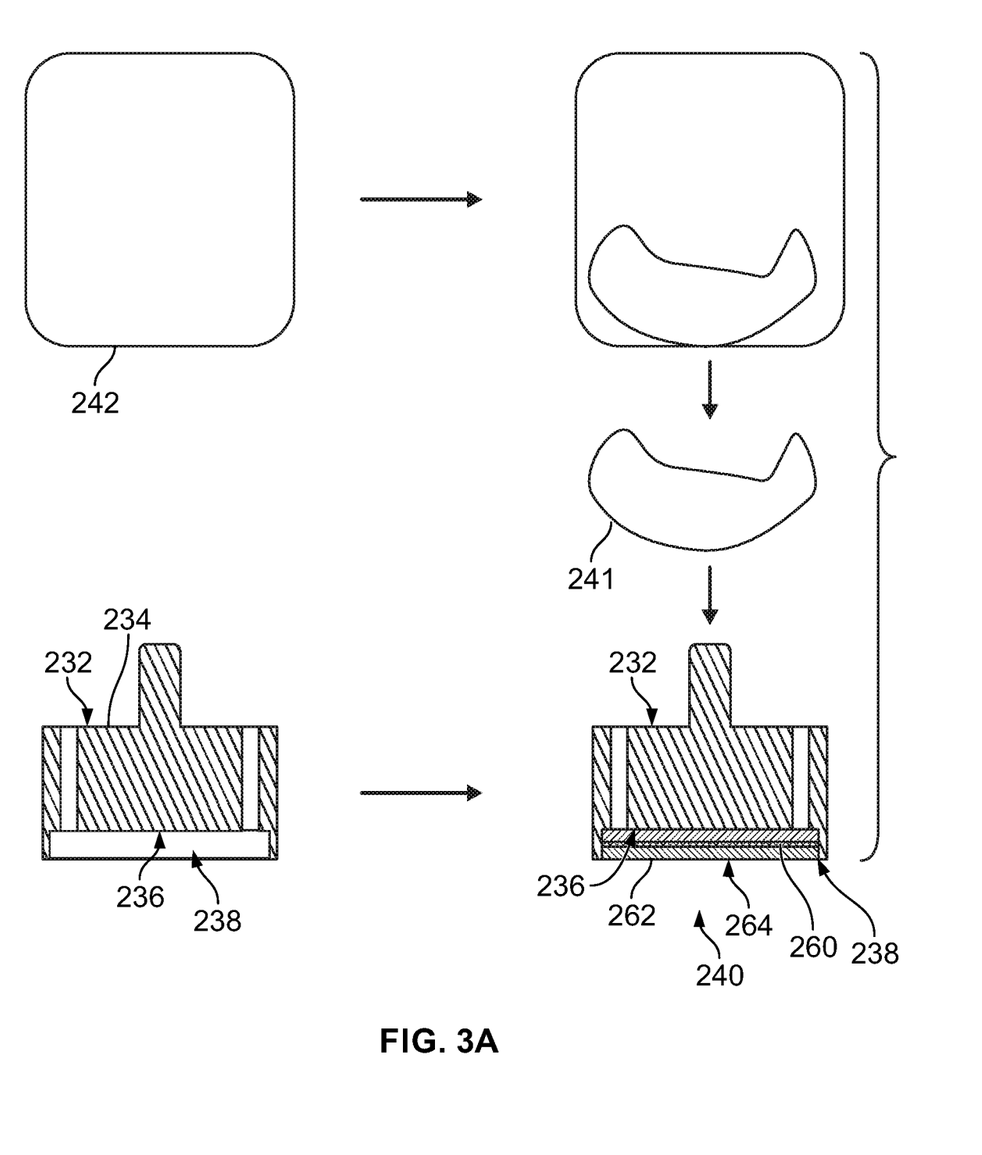
FIG. 3A is a cross-sectional view of an EAB mechanism being applied to an object in accordance with an embodiment.
Figure 3B:
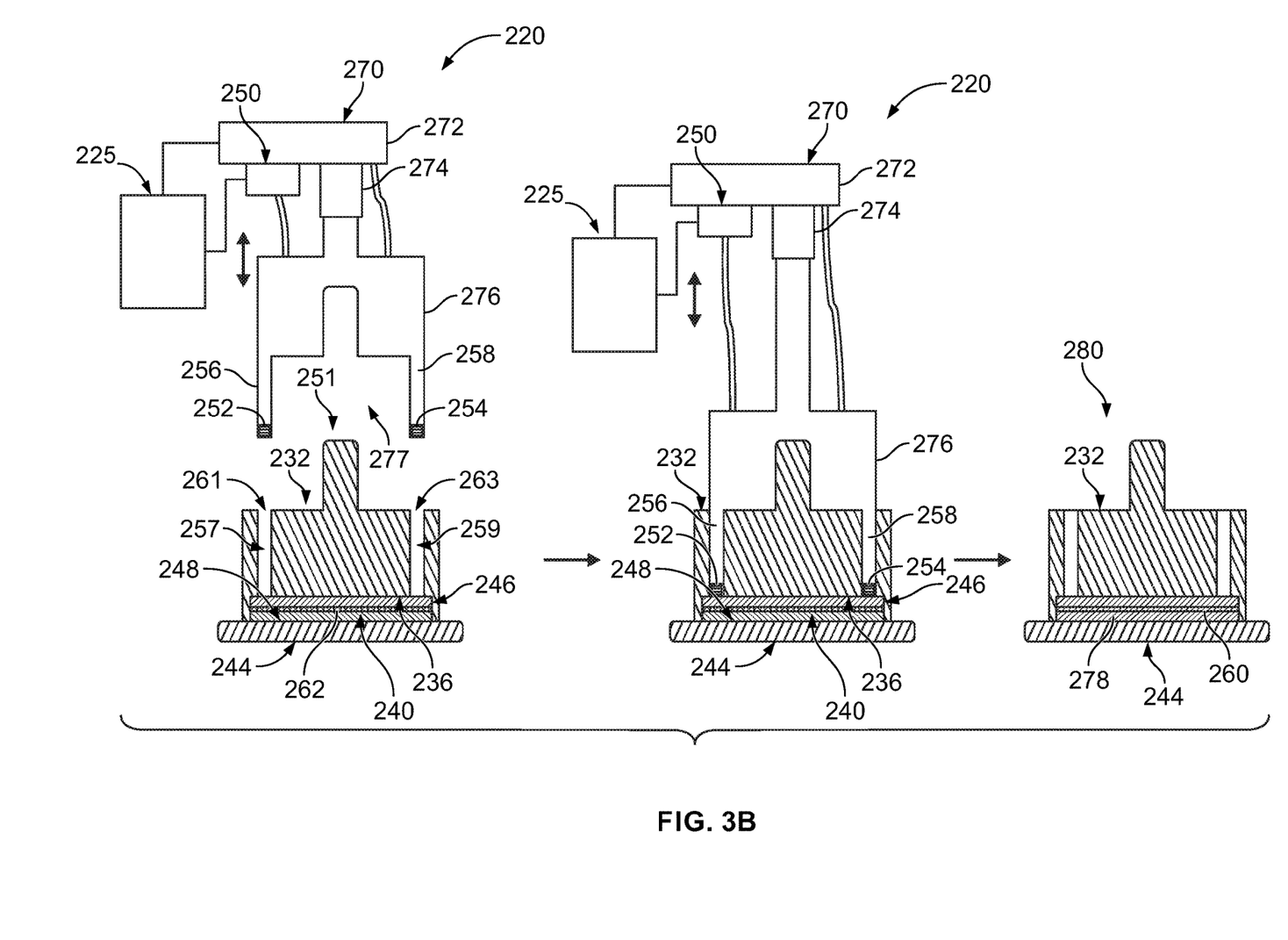
FIG. 3B is a cross-sectional view of an assembly system in accordance with an embodiment that may carry out the method of FIG. 2.

FIGS. 3A and 3B are cross-sectional views. Turning to FIG. 3A, the method 200 may include providing, at 202 (FIG. 2), a first object 232. The first object 232 may be a structural component. As one example, the first object 232 may be a bracket that is secured to a larger body (e.g., CFRP component). The first object 232 may be, for example, a thermoplastic composite, a metallic part, or a CRFP thermoset. It should be understood that the above materials are only examples of the different types of materials that may be used. The larger body may be the second object. The first object 232 has a body 234 that includes a surface 236. In the illustrated embodiment, the surface 236 partially defines an interior cavity or depression 238. In such embodiments, the surface 236 may be referred to as an interior surface. At 204 (FIG. 2), an EAB mechanism 240, which may be similar or identical to the EAB mechanism 100 (FIG. 1), is positioned against the surface 236. The EAB mechanism 240 includes a conductive layer 260 and heat-activatable adhesive material 262, which may be in the form of one or more adhesive layers.

The EAB mechanism 240 may be positioned such that the EAB mechanism 240 is disposed within the interior cavity 238 and an exterior surface 264 of the EAB mechanism 240 is exposed to an exterior of the first object 232. In other embodiments, the surface 236 may not define an interior cavity. For example, the surface 236 may be an exterior surface.

Figure 9:
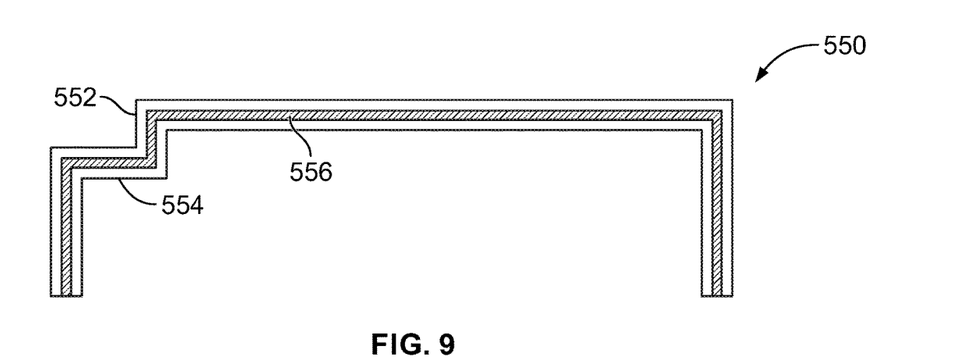
FIG. 9 is a side view of a three-dimensional pre-formed implant in accordance with an embodiment.

In some embodiments, the EAB mechanism 240 is pre-formed implant. For example, the EAB mechanism 240 may be a pre-formed film or sheet 241. The pre-formed film 241 may be one pre-formed film of a plurality of other pre-formed films that are removed from a larger sheet of material 242. For instance, after the larger sheet of material 242 is manufactured the pre-formed film 241 may be stamped, etched, cut or otherwise removed from the larger sheet of material 242. The pre-formed film 241 may be patterned to form a variety of two-dimensional shapes. In other embodiments, the pre-formed implant has a three-dimensional shape. FIG. 9 illustrates such a pre-formed implant. Alternatively, the pre-formed film 241 may be removed from a source of film. For example, the pre-formed film 241 may be part of an EAB roll. After unwinding the pre-formed film 241, the EAB roll may be cut to remove the pre-formed film 241.

Optionally, providing the first object 232, at 202 (FIG. 2), may include providing the first object 232 having the EAB mechanism 240 secured to the surface 236. For instance, the first object 232 having the EAB mechanism 240 may undergo a pre-conditioning process to facilitate the subsequent bonding process. The pre-conditioning process may cause crosslinking between the surface 236 and the EAB mechanism 240. For example, the first object 232 with the EAB mechanism 240 positioned adjacent to the surface 236 (or within the depression 238) may be heated (e.g., within an enclosed compartment such as an oven) such that a desired level of crosslinking between the surface 236 and the EAB mechanism 240 occurs. Depending on the specific type and properties of the adhesives selected in the EAB mechanism, the pre-conditioning process may enable a quicker subsequent bonding process. For instance, the duration of the subsequent bonding process may be decreased by multiple minutes For example, the bonding process with preconditioning may take about 6 minutes, but the bonding process with preconditioning may take 3 minutes. In particular embodiments, the preconditioning process reduces the bonding process by at least three minutes compared to the duration of the bonding process without preconditioning. In some embodiments, the preconditioning process reduces the bonding process by at least 25% compared to the duration of the bonding process without preconditioning. In particular embodiments, the preconditioning process reduces the bonding process by at least 40% compared to the duration of the bonding process without preconditioning. The first object 232 may be stored and/or shipped having the EAB mechanism integrated therewith.

As illustrated in FIG. 3B, a second object 244 is positioned, at 206 (FIG. 2), adjacent to the first object 232 such that the EAB mechanism 240 is disposed along an interface 246 between the first object 232 and the second object 244. The interface 246 represents the area or region where the opposing surfaces of the two objects abut each or other or are adjacent to each other. For example, the surface 236 of the first object 232 opposes a surface 248 of the second object 244. For embodiments that include a pre-formed film, the pre-formed film may be patterned to substantially cover the interface 246 between the first object 232 and a second object 244. As used herein, a pre-formed film or EAB mechanism may substantially cover an interface between two objects if an area of the pre-formed film covers at least 60% of the interface 246. In particular embodiments, the pre-formed film may be patterned to cover at least 80% or, more particularly, at least 90% of the interface. In other embodiments, however, the pre-formed film or EAB mechanism is not required to cover substantially all the interface. For example, the pre-formed film may cover only 10% of an interface.

The assembly system 220 may be configured to activate the adhesive materials and, optionally, apply pressure to the EAB mechanism. In some embodiments, the assembly system 220 is an automated machine (e.g., robotic system) that is configured to repeatedly carry out the bonding operation. At 208 (FIG. 2), the conductive layer 260 is energized (e.g., by applying a current therethrough). The conductive layer 260 includes conductive pathways that allow a current to flow through the conductive layer. The flow of current generates heat, thereby activating or melting the surrounding adhesive material. The conductive pathways may be formed by the fibers dispersed within the CF sheet material. Optionally, the conductive layer may also include discrete wires that are secured to the CF sheet material. The wires may be exposed within the interior cavity 238 so that electrodes 252, 254 (FIG. 3B) may connect to the wires for energizing the conductive layer. In some embodiments, the electrodes 252, 254 may displace a portion of the adhesive layer to connect directly to the conducive layer. Yet in other embodiments, the conductive layer may project beyond the other layers of the EAB mechanism so that electrodes may connect to the exposed portion of the conductive layer.

As shown in FIG. 3B, the EAB mechanism 240 is engaged by electrodes 252, 254. The electrodes 252, 254 are electrically connected to a power source 250. In the illustrated embodiment, the electrodes 252, 254 are positioned at distal ends of projections 256, 258, respectively. The electrodes 252, 254 cause a current to flow through the conductive layer 260 of the EAB mechanism 240, thereby generating thermal energy. This process may also be referred to as resistive heating. The thermal energy activates the adhesive layer of the EAB mechanism 240. In FIG. 3B, the electrodes 252, 254 displace the adhesive material 262 that surrounds the conductive layer 260, thereby connecting to the conductive layer 260. Alternatively, the EAB mechanism may be patterned to include an opening through the adhesive material so that the electrodes may engage the conductive layer.

As the conductive layer 260 is energized, at 208 (FIG. 2), pressure may also be applied, at 210 (FIG. 2). For example, the pressure may be applied by the coupling actuator 270. In the illustrated embodiment, the coupling actuator 270 includes a motor 272 and a piston 274 that is configured to move back-and-forth. The piston 274 is coupled to an actuator body 276 that is configured to engage the first object 232. The actuator body 276 has a mating face 277 that is designed to engage a mounting face 251 of the first object 232. More specifically, the mating and mounting faces 277, 251 are designed relative to one another such that the actuator body 276 and the coupling actuator 270 may apply a designated pressure along the first object. For example, the mating and mounting faces 277, 251 and the motor 272 may be configured to apply a uniform amount of pressure along the interface 246 during the bonding operation. The actuator body 276 includes the projections 256, 258. The actuator body 276 may be shaped to match a shape of the first object 232.

The assembly system 220 may also include a control sub-system 225. The control sub-system 225 may include one or more hardwired circuits and/or one or more processors that are configured to control the processes of the bonding operation. For example, the control sub-system 225 may control operation of the power source 250 and the coupling actuator 270. The control sub-system 225 may control the motor 272 to drive the piston 274, thereby moving the actuator body 276.

The control sub-system 225 may include a processor that includes processing circuitry configured to perform one or more tasks, functions, or steps, such as those described herein. For instance, the processor may be a logic-based device that performs operations based on instructions stored on a tangible and non-transitory computer readable medium, such as memory. It may be noted that a "processor," as used herein, is not intended to necessarily be limited to a single processor or single logic-based device. For example, the processor may include a single processor (e.g., having one or more cores), multiple discrete processors, one or more application specific integrated circuits (ASICs), and/or one or more field programmable gate arrays (FPGAs). In some embodiments, the processor is an off-the-shelf device that is appropriately programmed or instructed to perform operations, such as the bonding operations described herein. Alternatively or in addition to the above, the processor may include or may be associated with a tangible and non-transitory memory having stored thereon instructions configured to direct the processor to perform the algorithms described herein. Optionally, the control sub-system is part of a control panel that is accessible to an operator (e.g., technician) that monitors the assembly system 220. The operator may provide user inputs for controlling the assembly system 220.

The control sub-system 225 may also be or include a hard-wired circuitry (e.g., electronic circuitry) that performs the operations based on hard-wired logic that is configured to perform the algorithms described herein. For example, after positioning the first object alongside the second object, a technician may activate the assembly system by, for example, pressing a button. Upon activation, the hard-wired circuitry of the control sub-system 225 may cause the motor 272 to drive the actuator body 276 toward the first object. The control sub-system 225 may control the coupling actuator 270 to apply a designated amount of pressure and control the power source 250 to apply a designated amount of power within a designated time. The parameters controlled by the control sub-system 225 may be based on the particular application (e.g., objects being bonded by the EAB mechanism). The parameters may be pre-loaded or provided by the technician. Optionally, the technician may be permitted to modify pre-loaded values for the parameters.

During the bonding operation, the motor 272 drives the piston 274 to press the actuator body 276 against the first object 232, thereby providing a pressure within the interior cavity 238. The adhesive material may melt and take the shape of the interior cavity 238. More specifically, the adhesive material 262 within the interior cavity 238 may flow along the respective surfaces 236, 248 of the first and second objects 232, 244 and flow into any microscopic crevices of the surfaces 236, 248. For embodiments in which the EAB mechanism 240 is pre-conditioned, the time period for which the thermal energy and pressure are applied may be reduced.

Accordingly, the assembly system 200 may simultaneously apply pressure and provide the energy for energizing the EAB mechanism 240. More specifically, the actuator body 276 and the electrodes 252, 254 are secured to one another such that the electrodes 252, 254 and the coupling actuator 276 approach the first object 232 and the EAB mechanism 240 at the same time. Accordingly, the assembly system 200 may simultaneously apply pressure and energize the EAB mechanism 240 using a common structure (e.g., the coupling actuator and electrodes).

Optionally, the first object 232 may be designed to allow the electrodes 252, 254 to be inserted through the first object 232 to engage the EAB mechanism 240 within the depression 238. For example, the first object 232 includes electrode channels 257, 259 that are sized and shaped to receive the projections 256, 258, respectively. The electrode channels 257, 259 having openings 261, 263, respectively, that allow the electrodes 252, 254 to be inserted into the object to engage the EAB mechanism. As shown, the electrode channels 257, 259 are enclosed channels (e.g., tube-like channels) that only open to the exterior at the openings 261, 263. In other embodiments, the channels may be open-sided channels that open to the exterior along a length of the channels.

At 212 (FIG. 2), the adhesive material 262 is permitted to solidify. More specifically, the current may be removed thereby stopping generation of the thermal energy. The thermal energy within the adhesive material 262 may dissipate through the first object 232 and/or the second object 244. After a period of time, the adhesive material 262 may solidify, thereby providing a bond 278 that secures the first and second objects 232, 244 to each other along the interface 246. The conductive layer 260 remains within the bond 278 between the first and second objects 232, 244. The first and second objects and the bond 278 constitute an assembly 280 (FIG. 3B) in accordance with an embodiment.

The bonding operation may require less time than known bonding operations. Parameters that may be controlled include power for heating the conductive layer, pressure to be applied, and a time period (or duration) for when the heating and/or pressure is applied. For example, the power may be between 1 and 35 watts, the pressure may be between 0.5 and 5.0 pounds per square inch (psi) (or 3.45 to 34.47 kilopascals (kPa)), and the time period for applying the power and the pressure may be between 1 and 6 minutes.

Figure 4:
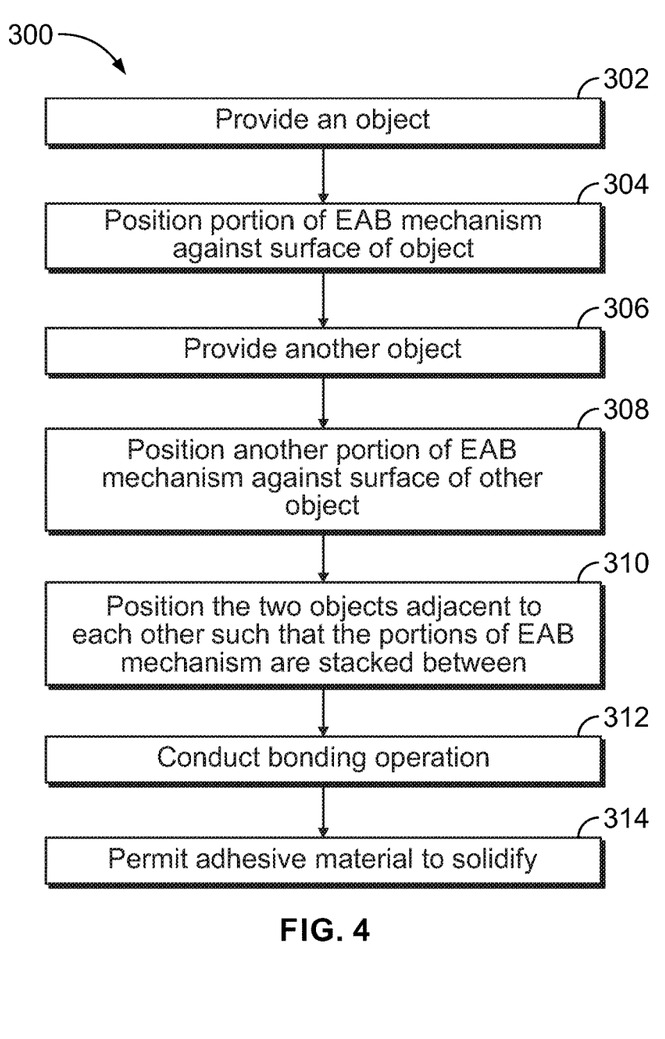
FIG. 4 is a flowchart illustrating a method in accordance with an embodiment.

FIG. 4 is a flowchart of a method 300 in accordance with an embodiment. The method 300 is described with reference to FIG. 5. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. The steps may be similar or identical to those described with respect to the method 200 (FIG. 2).

The method 300 may be, for example, a method of bonding two objects to each other or a method of manufacturing an apparatus that includes the two objects. The method 300, for example, may employ structures or aspects of various embodiments discussed herein. In some embodiments, the method 300 is performed using an apparatus, such as an apparatus 320 (FIG. 5) having a power source 350 and a coupling actuator 370.

Figure 5:
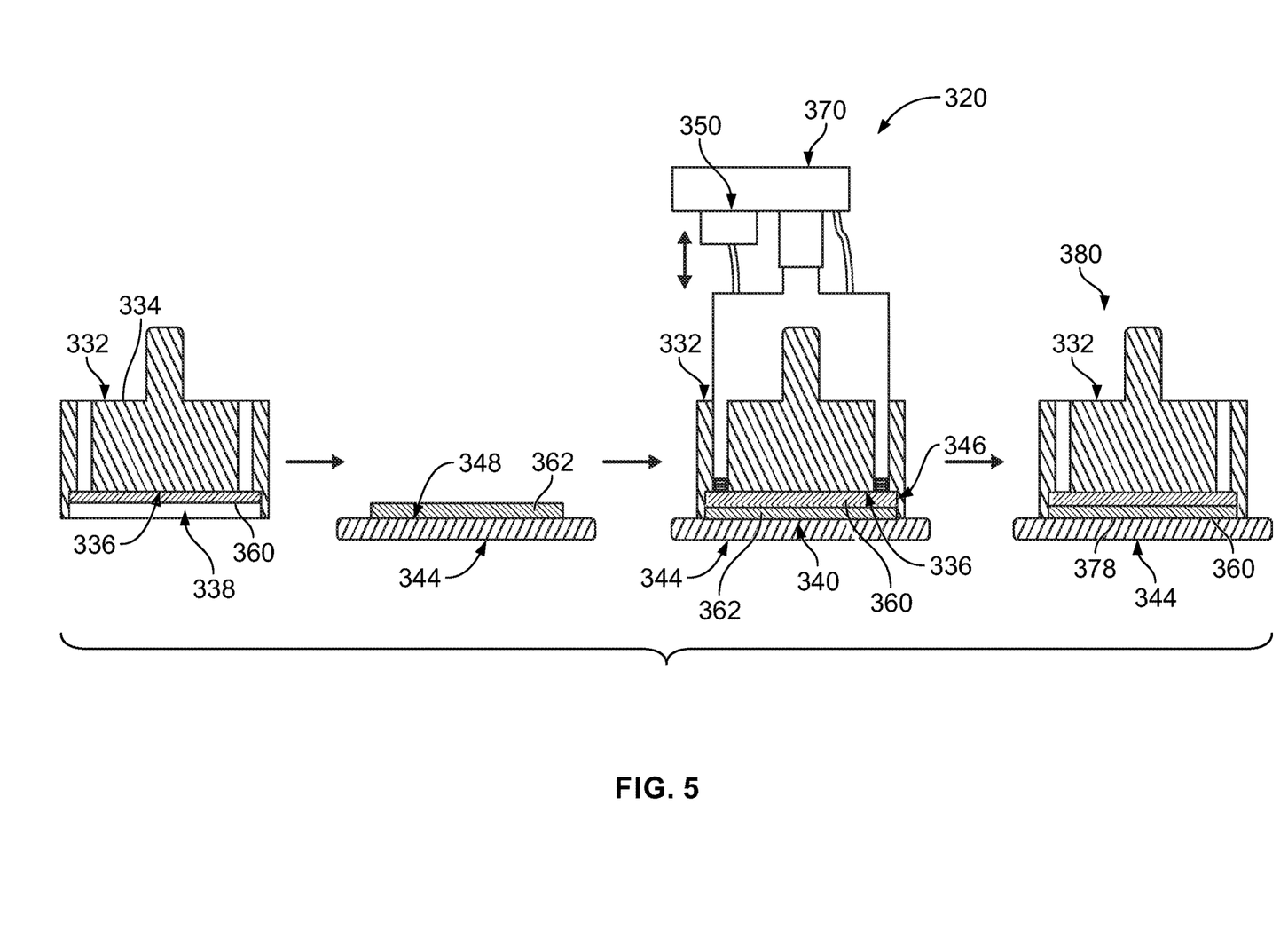
FIG. 5 is a cross-sectional view of an assembly system in accordance with an embodiment that may carry out the method of FIG. 4.

Turning to FIG. 5, the method 300 may include providing, at 302 (FIG. 4), a first object 332. The first object 332 has a body 334 that includes a surface 336. In the illustrated embodiment, the surface 336 partially defines an interior cavity or depression 338. At 304 (FIG. 4), a portion of an EAB mechanism is positioned against the surface 336. In the illustrated embodiment, a conductive layer 360 is positioned against the surface 336. In other embodiments, an adhesive layer may be positioned against the surface 336 or both a conductive layer 360 and an adhesive material may be positioned along the surface 336. For example, an EAB mechanism or a portion thereof may be attached to the first object through pre-conditioning as described above with respect to step 205 (FIG. 2). Optionally, providing the first object 332, at 302 (FIG. 4), may include providing the first object 332 having the portion of the EAB mechanism secured to the surface 336.

At 306 (FIG. 4), a second object 344 is provided having a surface 348. At 308 (FIG. 4), another portion of an EAB mechanism is positioned against the surface 348. The portion may be, for example, an adhesive layer 362. Optionally, providing the second object 344, at 308 (FIG. 4), may include providing the second object 344 having the portion of the EAB mechanism secured to the surface 348.

At 310 (FIG. 4), the two objects 332, 344 may be positioned adjacent to each other such that the portions of the EAB mechanism (e.g., the conductive layer 360, the adhesive layer 362, and optionally one or more other layers) are stacked side-by-side, thereby forming an EAB mechanism 340. The EAB mechanism 340 is disposed within the interior cavity 338 along an interface 346. At 312 (FIG. 4), a bonding operation may be conducted. The bonding operation may be similar or identical to the bonding operation described with respect to FIGS. 2 and 3. More specifically, the conductive layer 360 may be energized to heat the adhesive layer 362, thereby melting the adhesive material. Pressure may also be applied by the assembly system 320. In some embodiments, the conductive layer 360 is porous or permeable such that the adhesive material may flow through the conductive layer 360. For example, the conductive layer 360 may be a veil or mesh, such as those described above.

At 314 (FIG. 4), the adhesive material is permitted to solidify, thereby providing a bond 378 that secures the first and second objects 332, 344 to each other along the interface 346. The conductive layer 360 remains within the bond 378 between the first and second objects 332, 344. The first and second objects and the bond 378 constitute an assembly 380 in accordance with an embodiment.

The methods 200 (FIG. 2) and 300 (FIG. 4) may be carried out in less time compared to other known bonding operations. By way of example, adhesive bonding may occur in less than six minutes for objects in which the interfacing area is 10 cm$^2$ or less. In particular embodiments, as the current is applied through the conductive layer to provide the thermal energy, the first object and the second object may not receive additional thermal energy from another source. It is understood that thermal energy may inherently or naturally exist in the ambient environment. In this case, the thermal energy that naturally occurs in the ambient environment is not considered "additional thermal energy from another source." For instance, one or more embodiments may not require an oven or a heated surface to activate the adhesive material.

In some embodiments, the solidified bond between two objects may be melted so that the two objects may be separated. For example, thermal energy may be re-applied in a similar manner as described above. After a designed period of time, the adhesive material may melt, thereby permitting the two objects to be separated.

Figure 6:
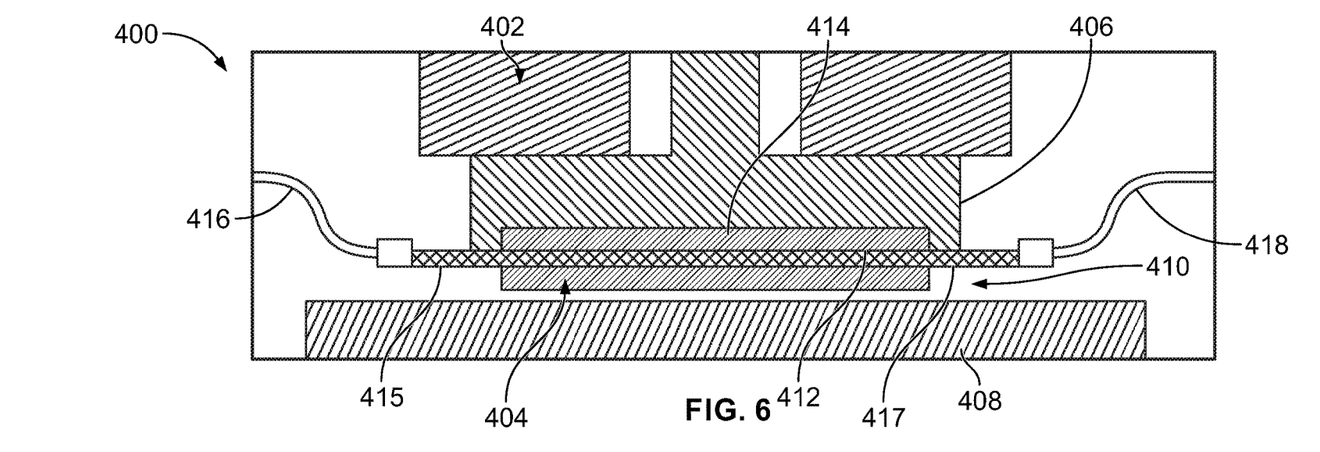
FIG. 6 is a cross-sectional view of an assembly system in accordance with an embodiment that may carry out the method of FIG. 2 or the method of FIG. 4.

FIG. 6 is a cross-sectional view of an assembly system 400 in accordance with an embodiment that may carry out the method 200 (FIG. 2) or the method 300 (FIG. 4). The assembly system 400 includes an assembly system 402, which may be similar or identical to the assembly system 220 (FIG. 3) or the assembly system 320 (FIG. 5). Also shown, an EAB mechanism 404 is positioned along an interface 410 between a first object 406 and a second object 408. The EAB mechanism 404 includes a conductive layer 412 and adhesive material 414. As shown, the conductive layer 412 has exposed sections 415, 417 that extend laterally beyond the adhesive material 414 such that the conductive layer 412 is exposed to an exterior. The assembly system 402 includes conductive pathways 416, 418 that are electrically connected to the conductive layer 412. The assembly system 402 is configured to energize the conductive layer 412, as described herein, thereby activating the adhesive material.

Figure 7:
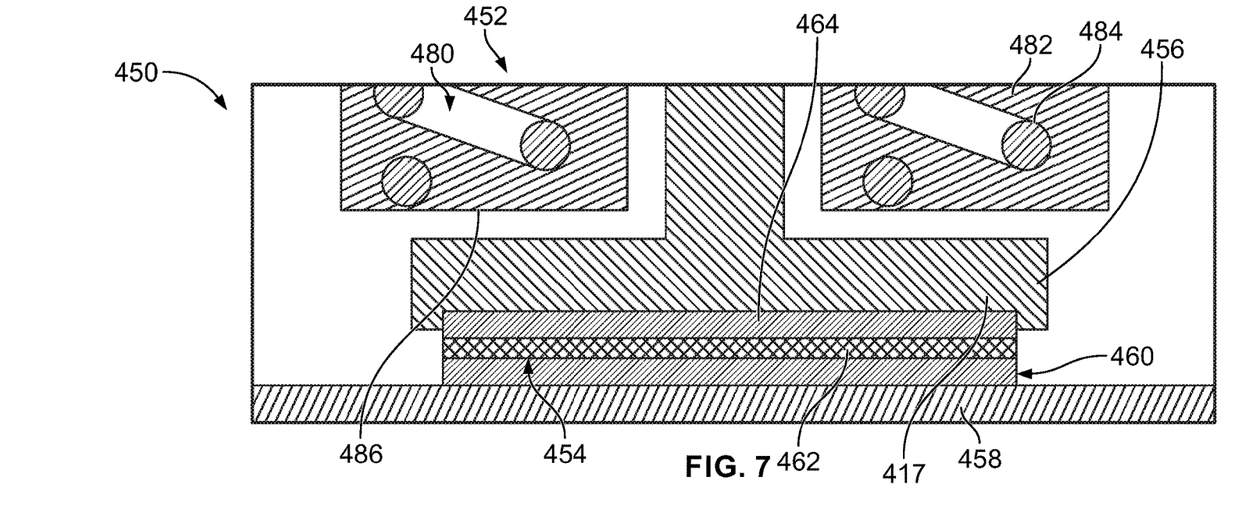
FIG. 7 is a cross-sectional view of an assembly system in accordance with an embodiment that may carry out the method of FIG. 2 or the method of FIG. 4.

FIG. 7 is a cross-sectional view of an assembly system 450 in accordance with an embodiment that may carry out the method 200 (FIG. 2) or the method 300 (FIG. 4). The assembly system 450 includes an assembly system 452. Also shown, an EAB mechanism 454 is positioned along an interface 460 between a first object 456 and a second object 458. The EAB mechanism 454 includes a conductive layer 462 and adhesive material 464. Alternatively, the EAB mechanism 454 may include an adhesive material that is embedded or impregnated with metallic particles that are evenly dispersed throughout the adhesive material. For example, the EAB mechanism 454 may be a conductive polymer compound having embedded metallic particles.

Unlike the assembly systems 220, 320, and 402, the assembly system 452 is configured to energize the conductive layer 462 through induction. The assembly system 452 includes a coupling actuator 480 having an actuator body 482. The coupling actuator 480 also includes an induction coil 484 disposed within the actuator body 482. The induction coil 484 is positioned adjacent to an end surface 486 of the actuator body 482 that abuts the first object 456. During a bonding operation, the induction coil 484 generates an electromagnetic field that induces a current within the conductive layer 462, thereby generating thermal energy that activates the adhesive layer. For embodiments that include an EAB mechanism with metallic particles (e.g., a conductive polymer compound), the electromagnetic field induces a current through the metallic particles, thereby generating thermal energy that activates the adhesive layer.

Figure 8:
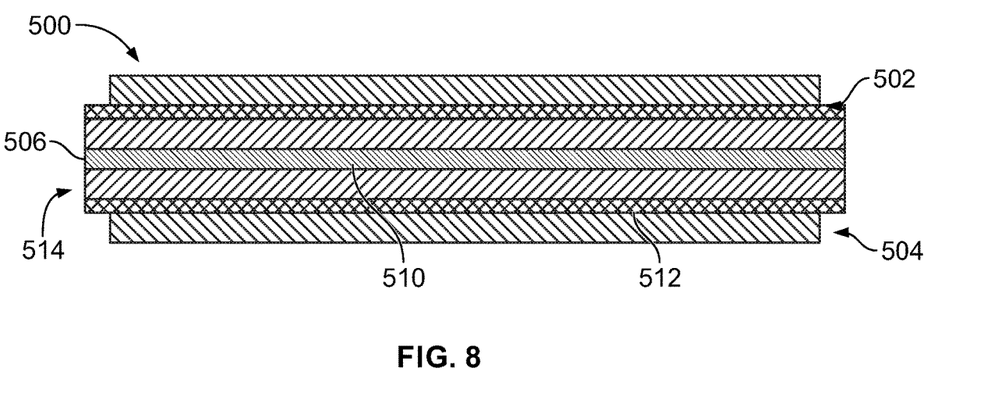
FIG. 8 is a cross-sectional view of an EAB mechanism having multiple sub-stacks in accordance with an embodiment.

FIG. 8 is a side view of an EAB mechanism 500 having multiple sub-stacks in accordance with an embodiment. More specifically, the EAB mechanism 500 includes a first sub-stack 502, a second sub-stack 504, and a stiffening layer 506 disposed therebetween. The first and second sub-stacks 502, 504 may be similar or identical to other EAB mechanisms described herein, such as the EAB mechanism 100 (FIG. 1). As described above, a single layer may have multiple sub-layers. In FIG. 8, each of the sub-stacks may constitute a single layer having multiple sub-layers. Each of the first and second sub-stacks 502, 504 includes a conductive layer 510 and adhesive material 512. The conductive layers 510 are exposed along an outer edge 514 of the EAB mechanism 500. As such, the conductive layers 510 for each of the first and second sub-stacks 502, 504 is exposed at multiple points for energizing the conductive layers 510. The stiffening layer 506 may enhance the structural integrity of the EAB mechanism 500 and enable stacking of the different layers to increase a height of the EAB mechanism. The stiffening layer 506 may enable bonding two objects together in which the interior cavity of the interface necessitates a greater height for the EAB mechanism. It should be understood, however, that embodiments do not require a stiffening layer.

FIG. 9 is a side view of a three-dimensional pre-formed implant 550 in accordance with an embodiment. The pre-formed implant 550 includes first and second adhesive layers 552, 554 and a conductive layer 556 therebetween. In some embodiments, the first and second adhesive layers 552, 554 and the conductive layer 556 may be stacked with respect to one another and then pressed to form a three-dimensional shape. In such embodiments, the pre-formed implant 550 may better conform to the shape of the interface between the two objects.

Figure 10:
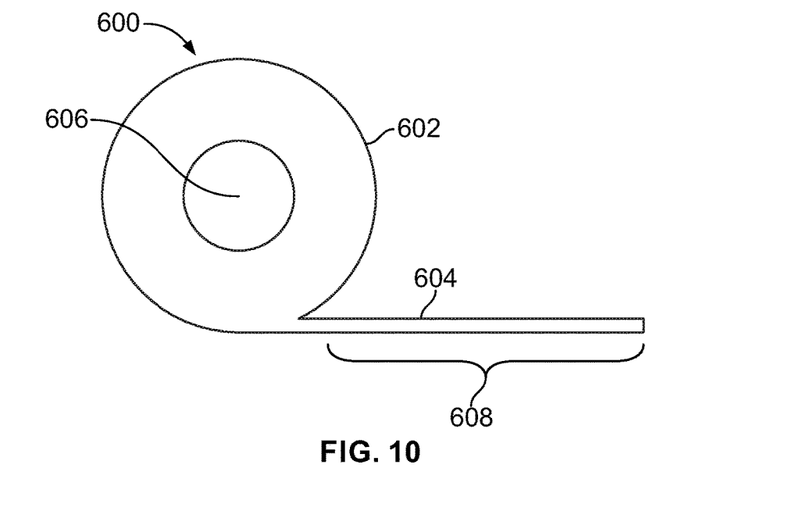
FIG. 10 is a side view of an EAB mechanism formed in accordance with another embodiment.

FIG. 10 is a side view of an EAB mechanism 600 formed in accordance with another embodiment. The EAB mechanism 600 may be similar or identical to the EAB mechanisms described above. For example, the EAB mechanism 600 may include one or more adhesive layers and one or more conductive layers (or CF sheets). However, the EAB mechanism 600 forms a roll 602. More specifically, the EAB mechanism 600 is a multi-layer tape 604 that is wound about an axis 606 to form the roll 602. In such embodiments, the EAB mechanism 600 may be selectively applied by unrolling a desired length 608 of the EAB mechanism 600.

It should be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and/or the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

What is claimed is:

1. A system comprising:
a first object having
an energy-assisted bonding (EAB) mechanism along a surface of the first object, the EAB mechanism including a heat-activatable adhesive layer and a carbon-filled (CF) sheet material, the CF sheet material extending alongside the adhesive layer or through the adhesive layer, the CF sheet material being electrically conductive for resistive heating, and
a mounting face;
a coupling actuator having an actuator body with a mating face that is sized and shaped to engage the mounting face of the first object;
a power source;
at least one electrode operably coupled to the power source and attached to the actuator body, wherein the at least one electrode approaches the EAB mechanism as the actuator body approaches the first object; and
a control sub-system operably coupled to the coupling actuator and the power source, the control sub-system configured to:
control the coupling actuator to drive the actuator body and the at least one electrode toward the first object such that the at least one electrode engages the CF sheet material, wherein the mating face of the actuator body and the mounting face of the first object engage each other, the coupling actuator configured to apply pressure to the EAB mechanism along the surface of the first object; and
control the power source to apply a current to the at least one electrode and through the CF sheet material, thereby generating thermal energy through resistive heating that activates the adhesive layer for bonding to a second object.

2. The system of claim 1, wherein the EAB mechanism is a pre-formed film that includes the adhesive layer and the CF sheet material.

3. The system of claim 2, wherein the first object has a depression in which the EAB mechanism is positioned, the pre-formed film being patterned to substantially fill the depression.

4. The system of claim 1, wherein the at least one electrode includes a plurality of electrodes operably coupled to the power source and secured in fixed positions with respect to the actuator body, wherein the electrodes approach the EAB mechanism as the actuator body approaches the first object.

5. The system of claim 4, wherein the first object includes electrode channels, the electrode channels opening to an exterior of the first object at a first end and opening to the EAB mechanism at a second end, wherein the electrodes are permitted to advance through the electrode channels and engage the EAB mechanism as the actuator body approaches the first object.

6. The system of claim 1, wherein the adhesive layer is a first adhesive layer and the EAB mechanism includes a second adhesive layer, the second adhesive layer being heat-activatable, the first and second adhesive layers having a same composition or different compositions.

7. The system of claim 1, wherein the CF sheet material includes or is electrically connected to conductive pathways for energizing the CF sheet material, the at least one electrode including multiple electrodes configured to engage the conductive pathways.

8. The system of claim 1, wherein the CF sheet material includes carbon elements dispersed within a binder material and the CF sheet material is a nonwoven carbon veil having an areal weight of between 2 $g/m^2$ and 50 $g/m^2$.

9. The system of claim 1, wherein the actuator body includes a projection, the at least one electrode being positioned at a distal end of the projection.

10. The system of claim 9, wherein the first object includes an electrode channel, the electrode channel opening to an exterior of the first object at a first end and opening to the EAB mechanism at a second end, wherein the projection is permitted to advance through the electrode channel for engaging the EAB mechanism with the at least one electrode.

11. A pre-conditioned object configured to be bonded to a second object, the pre-conditioned object comprising:
a surface of the pre-conditioned object;

a channel having first and second openings, the first opening being located along an exterior of the pre-conditioned object; and an energy-assisted bonding (EAB) mechanism attached to the surface, the EAB mechanism including a heat-activatable adhesive layer and a carbon-filled (CF) sheet material, the CF sheet material extending alongside the adhesive layer or through the adhesive layer, the CF sheet material being electrically conductive for resistive heating;

wherein the adhesive layer is secured to the surface of the pre-conditioned object through crosslinking;

wherein the second opening of the channel is located along the surface having the EAB mechanism attached thereto.

12. The pre-conditioned object of claim 11, wherein the EAB mechanism also includes conductive pathways electrically connected to the CF sheet material for energizing the CF sheet material, the conductive pathways being exposed to an exterior space of the pre-conditioned object.

13. The pre-conditioned object of claim 11, wherein the EAB mechanism is a pre-formed film having an outer edge, the outer edge being a stamped or cut outer edge.

14. The pre-conditioned object of claim 11, wherein the CF sheet material includes carbon elements dispersed within a binder material.

15. The pre-conditioned object of claim 11, wherein the channel is sized and shaped to allow an electrode to be inserted into the channel through the first opening and engage the EAB mechanism through the second opening.

16. The pre-conditioned object of claim 11, wherein the adhesive layer includes first and second adhesive layers having the CF sheet material therebetween to form a sub-stack, the CF sheet material being a first CF sheet material, the EAB mechanism including at least one additional sub-stack that includes a second CF sheet material and a third adhesive layer, the pre-conditioned object further comprising a stiffening layer disposed between the first and second adhesive layers.

17. A pre-conditioned object configured to be bonded to a second object, the pre-conditioned object comprising:

a surface of the pre-conditioned object; and an energy-assisted bonding (EAB) mechanism attached to the surface, the EAB mechanism including a heat-activatable adhesive layer and a carbon-filled (CF) sheet material, the CF sheet material extending alongside the adhesive layer or through the adhesive layer, the CF sheet material being electrically conductive for resistive heating, wherein an outer surface of the EAB mechanism represents an exterior surface of the pre-conditioned object that is configured to be bonded to the second object;

wherein the CF sheet material is a nonwoven carbon veil having an areal weight of between 2 g/m$^2$ and 50 g/m$^2$.

18. The pre-conditioned object of claim 17, wherein the EAB mechanism is a pre-formed film that includes the adhesive layer and the CF sheet material, wherein the pre-formed film is patterned to cover at least 60% of an interface between the pre-conditioned object and the second object.

19. The pre-conditioned object of claim 17, wherein the EAB mechanism is a pre-formed film that includes the adhesive layer and the CF sheet material, wherein the CF sheet material has a thickness of at most 50 micrometers.

20. The pre-conditioned object of claim 17, wherein the EAB mechanism is a pre-formed film that includes the adhesive layer and the CF sheet material, wherein the pre-formed film has a three-dimensional shape such that the adhesive layer and the CF sheet material extend parallel to a first plane for a portion of the pre-formed film and extend parallel to another a second plane for another a second portion of the pre-formed film.

* * * * *